United States Patent
Guo et al.

(10) Patent No.: US 10,903,473 B2
(45) Date of Patent: Jan. 26, 2021

(54) TERMINAL AND BUSBAR ATTACHMENT METHOD AND ASSEMBLY

(71) Applicant: Ford Global Technologies, LLC, Dearborn, MI (US)

(72) Inventors: Yunan Guo, Rochester Hills, MI (US); Yongcai Wang, Ann Arbor, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 16/177,678

(22) Filed: Nov. 1, 2018

(65) Prior Publication Data

US 2020/0144582 A1    May 7, 2020

(51) Int. Cl.
| | |
|---|---|
| *H01M 2/26* | (2006.01) |
| *B23K 26/26* | (2014.01) |
| *B23K 101/36* | (2006.01) |
| *H01M 10/0525* | (2010.01) |

(52) U.S. Cl.
CPC ............ *H01M 2/266* (2013.01); *B23K 26/26* (2013.01); *B23K 2101/36* (2018.08); *H01M 10/0525* (2013.01); *H01M 2220/20* (2013.01)

(58) Field of Classification Search
None
See application file for complete search history.

(56) References Cited

U.S. PATENT DOCUMENTS

| 10,056,597 B2 | 8/2018 | Park et al. |
| 2013/0029206 A1 | 1/2013 | Lev |

FOREIGN PATENT DOCUMENTS

| CN | 107717225 | 2/2018 |
| JP | 2001283824 | 10/2001 |
| JP | 2018107030 | 7/2018 |

*Primary Examiner* — Wyatt P McConnell
(74) *Attorney, Agent, or Firm* — David Kelley, Esq.; Carlson, Gaskey & Olds, P.C.

(57) ABSTRACT

An exemplary attachment method includes, among other things, to electrically couple a first battery cell to a busbar, joining a terminal of the first battery cell to the busbar with a first weld. The method further includes, to electrically couple a second battery cell to the busbar, joining a terminal of the second battery cell to the terminal of the first battery cell with a second weld. An exemplary attachment assembly includes, among other things, a busbar, a first terminal of a first battery cell, and a second terminal of a second battery cell. The first terminal is electrically coupled to the busbar with a first weld that joins the first terminal to the busbar. The second terminal is electrically coupled to the busbar with a second weld that joins the second terminal to the first terminal.

20 Claims, 7 Drawing Sheets

TERMINAL AND BUSBAR ATTACHMENT METHOD AND ASSEMBLY

TECHNICAL FIELD

This disclosure relates generally to attaching a battery terminal to a busbar and, more particularly, to attaching multiple terminals to a busbar.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells that store energy. The battery cells must be reliably connected to one another in order to achieve the voltage and power levels necessary for powering these electrical loads. Busbars are commonly used to connect the battery cells.

SUMMARY

An attachment method according to an exemplary aspect of the present disclosure includes, among other things, to electrically couple a first battery cell to a busbar, joining a terminal of the first battery cell to the busbar with a first weld. The method further includes, to electrically couple a second battery cell to the busbar, joining a terminal of the second battery cell to the terminal of the first battery cell with a second weld.

In a further non-limiting embodiment of the foregoing method, the first weld is separate and distinct from the first weld.

In a further non-limiting embodiment of any of the forgoing methods, the second weld does not penetrate to the busbar.

In a further non-limiting embodiment of any of the forgoing methods, the first and second welds are laser welds.

A further non-limiting embodiment of any of the foregoing methods includes, prior to joining the terminal of the second battery cell to the terminal of the first battery cell, folding a portion of the terminal of the second battery cell over the terminal of the first battery cell.

A further non-limiting embodiment of any of the foregoing methods includes moving a wiper member against the terminal of the second battery cell to fold the terminal of the second battery cell over a fulcrum and over the terminal of the first battery cell.

A further non-limiting embodiment of any of the foregoing methods includes, after the folding and prior to the joining, moving the terminals of the first and second battery cells against an alignment fixture to position the terminals for the joining.

A further non-limiting embodiment of any of the foregoing methods includes, to electrically couple a third battery cell to the busbar, joining a terminal of the third battery cell to the terminal of the second battery cell with a third weld.

A further non-limiting embodiment of any of the foregoing methods includes sandwiching the terminal of the first battery cell between the busbar and the terminal of the second battery cell when the first and second battery cells are electrically coupled to the busbar via the first and second welds.

A further non-limiting embodiment of any of the foregoing methods includes placing a first surface of the terminal of the first battery cell against a surface of the busbar when joining with the first weld, and placing a first surface of the terminal of the second battery cell against a second surface of the terminal of the first battery cell when joining with the second weld.

In a further non-limiting embodiment of any of the foregoing methods, after joining with the first and second welds, the terminal of the first battery cell extends a first distance from a side of the busbar across the surface of the busbar, and the terminal of the second battery cell extends a second distance from a side of the busbar across the surface of the busbar. The first distance is greater than the second distance.

An attachment assembly according to another exemplary aspect of the present disclosure includes, among other things, a busbar, a first terminal of a first battery cell, and a second terminal of a second battery cell. The first terminal is electrically coupled to the busbar with a first weld that joins the first terminal to the busbar. The second terminal is electrically coupled to the busbar with a second weld that joins the second terminal to the first terminal.

In a further non-limiting embodiment of the foregoing assembly, the first weld is spaced from the second weld such that the first and second welds are separate and distinct from each other.

In a further non-limiting embodiment of any of the foregoing assemblies, the second weld does not penetrate to the busbar.

In a further non-limiting embodiment of any of the foregoing assemblies, the first and second welds are laser welds.

In a further non-limiting embodiment of any of the foregoing assemblies, a portion of the first terminal is folded over a surface of the busbar when the first weld joins the first terminal to the busbar, and a portion of the second terminal is folded over the second terminal when the second weld joins the second terminal to the first terminal.

In a further non-limiting embodiment of any of the foregoing assemblies, the portion of the first terminal is additionally folded over a first fulcrum when the first weld joins the first terminal to the busbar, and the portion of the second terminal is additionally folded over a second fulcrum when the second weld joins the second terminal to the first terminal.

In a further non-limiting embodiment of any of the foregoing assemblies, the first weld is a spaced a first distance from a side of the busbar, and the second weld is spaced a second distance from a side of the busbar, the first distance greater than the second distance.

A further non-limiting embodiment of any of the foregoing assemblies includes a third terminal of a third battery cell. The third terminal is electrically coupled to the busbar with a third weld that joins the third terminal to the second terminal.

A further non-limiting embodiment of any of the foregoing assemblies includes a third terminal of a third battery cell. The third terminal is electrically coupled to the busbar with a third weld that joins the third terminal to the first terminal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to an attachment method that electrically couples terminals of battery cells to a busbar, and a corresponding attachment assembly incorporating terminals electrically coupled to a busbar. The attachment method and attachment assembly utilize welds that are separate and distinct from one another, which can, among other things, facilitate thermal energy dissipation when welding. These and other benefits will be appreciated from the following description.

Figure 1:
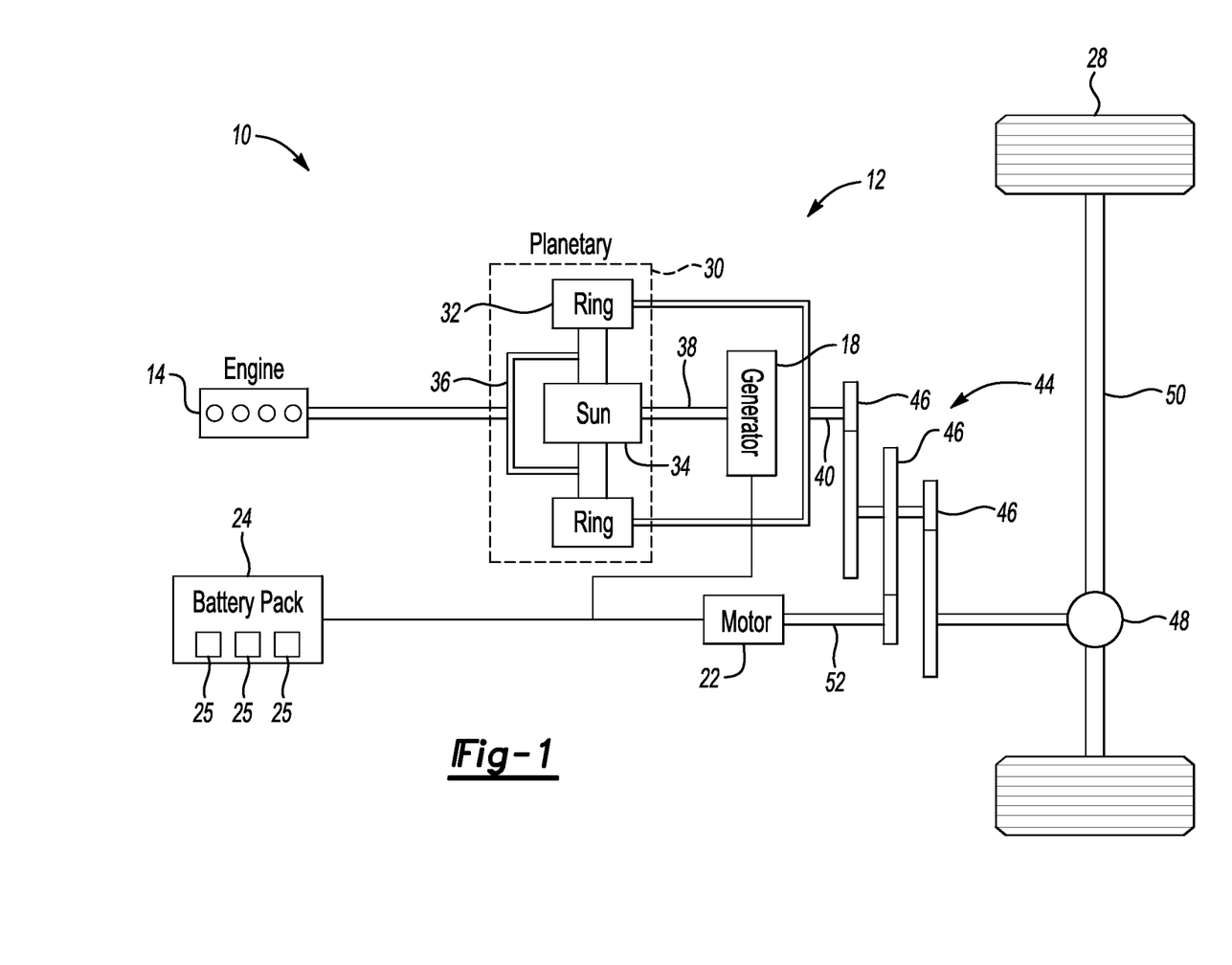
FIG. 1 illustrates a schematic view of a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24 (or simply, "battery 24"). In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figures 2, 3:
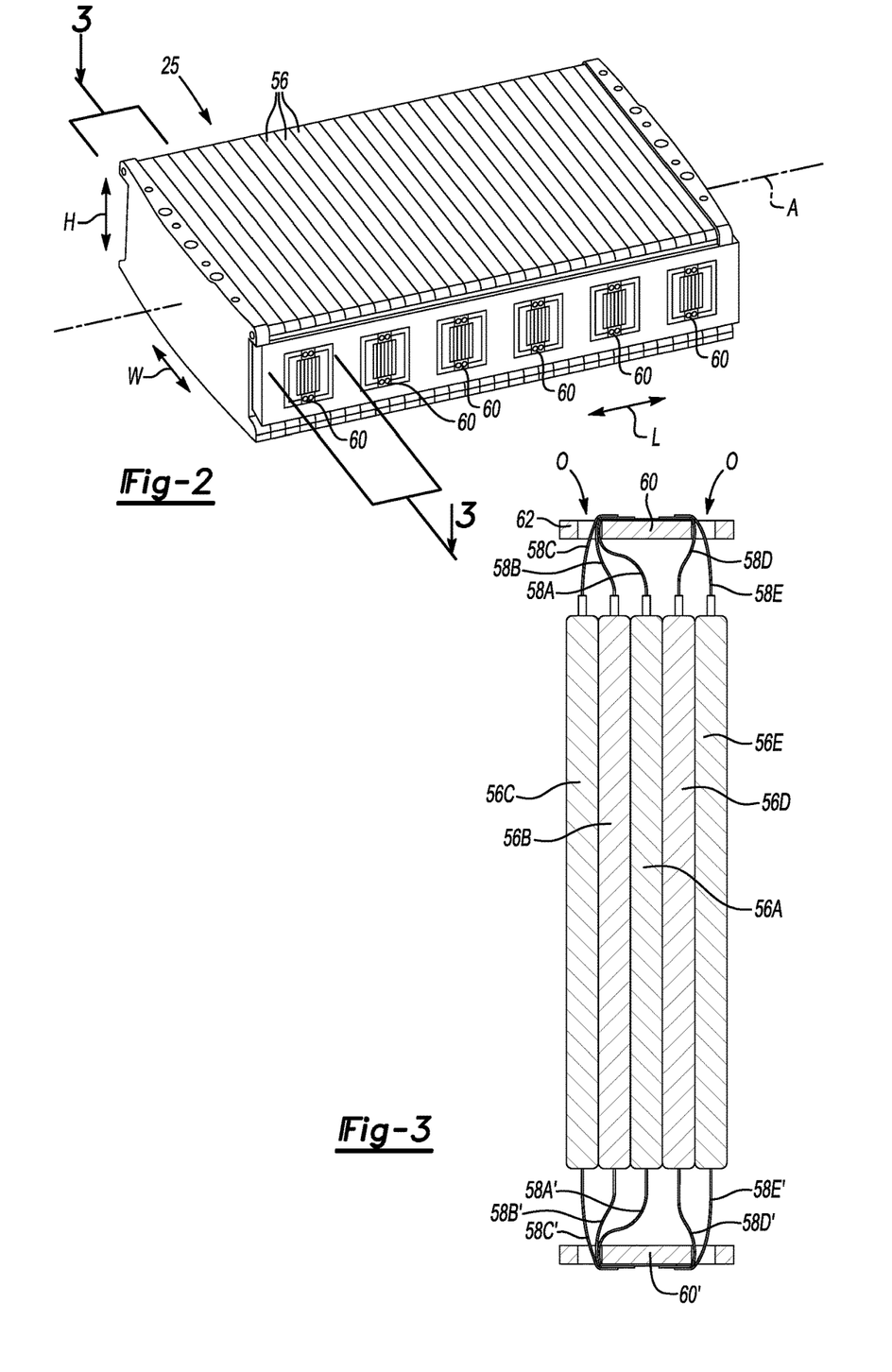
FIG. 2 illustrates a battery assembly from a battery pack of the powertrain of FIG. 1.
FIG. 3 is a section view taken at line 3-3 in FIG. 2 showing a group of battery cells having terminals secured to a busbar.

FIG. 2 illustrates a battery assembly 25 that can be employed within an electrified vehicle. For example, the battery assembly 25 could be a component of the battery pack 24 of the electrified vehicle 12 of FIG. 1. The battery assembly 25 includes a plurality of battery cells 56 that store energy for powering various electrical loads of the electrified vehicle 12. Although a specific number of battery cells 56 are depicted in FIG. 2, the battery assembly 25 could employ a greater or fewer number of cells within the scope of this disclosure. In other words, this disclosure is not limited to the specific configuration shown in FIG. 2.

The battery cells 56, along with any support structures (e.g., array frames, spacers, rails, walls, plates, bindings, etc.), may collectively be referred to as the battery assembly 25. The battery pack 24 may include one or more of the battery assemblies 25. The battery cells 56 may be stacked side-by-side along a longitudinal axis A to construct a grouping of battery cells 56, sometimes referred to as a "cell stack." Further, while the battery cells 56 are labeled in FIG. 2, FIG. 2 is only meant to illustrate an example stacked arrangement of battery cells 56 at a schematic level. The battery assembly 25 generally exhibits a length L parallel to the longitudinal direction A, a height H normal to the length L, and a width W normal to the length L and height H.

In an embodiment, the battery cells 56 are pouch cells. Generally, pouch cells employ a laminated architecture within a bag. In an example, pouch cells include conductive foil tabs welded to an electrode, which is sealed within a pouch. The tabs extend from the pouch as positive and negative terminals.

This disclosure is not limited to pouch cells, however. In particular, prismatic, lithium-ion cells and cells having other geometries (cylindrical, etc.) and/or other chemistries (nickel-metal hydride, lead-acid, etc.) could alternatively be utilized within the scope of this disclosure.

Within the battery assembly 25, the battery cells 56 can be arranged in groups G, one of which is shown in FIG. 3. The group G includes five battery cells 56A-56E each including a respective terminal 58A-58E electrically coupled to a busbar 60. In this example, the terminals 58A-58E are positive terminals extending from a first lateral sides of the battery cells 56A-56E. The terminals 58A-58E extend through an opening O in a busboard module 62 to connect with the busbar 60, which is held by the busboard module 62. The busboard module 62 can be part of an interconnector in some examples.

Negative terminals 58A'-58E' extend from opposite, second lateral sides of the battery cells 56A-56E. The negative terminals 58A'-58E' are electrically coupled to another busbar 60'.

In another example, positive and negative terminals extend from other sides of the respective battery cells 56A-56E, or both extend from the same respective sides of the battery cells 56A-56E. In some examples, positive terminals are aluminum and negative terminals are copper.

The terminals 58A-58E of the groups G are electrically coupled to the busbar 60. Multiple groups G of the battery cells 56 can be arranged along the axis A within the battery assembly 25. The terminals of the battery cells in each of the other groups G are secured to other respective busbars 60.

In the exemplary embodiment, each of the groups G includes five battery cells 56, and five terminals 58A-58E secured to the busbar 60. Other exemplary embodiments include more than five or fewer than five battery cells 56 in each of the groups G.

Figure 4:
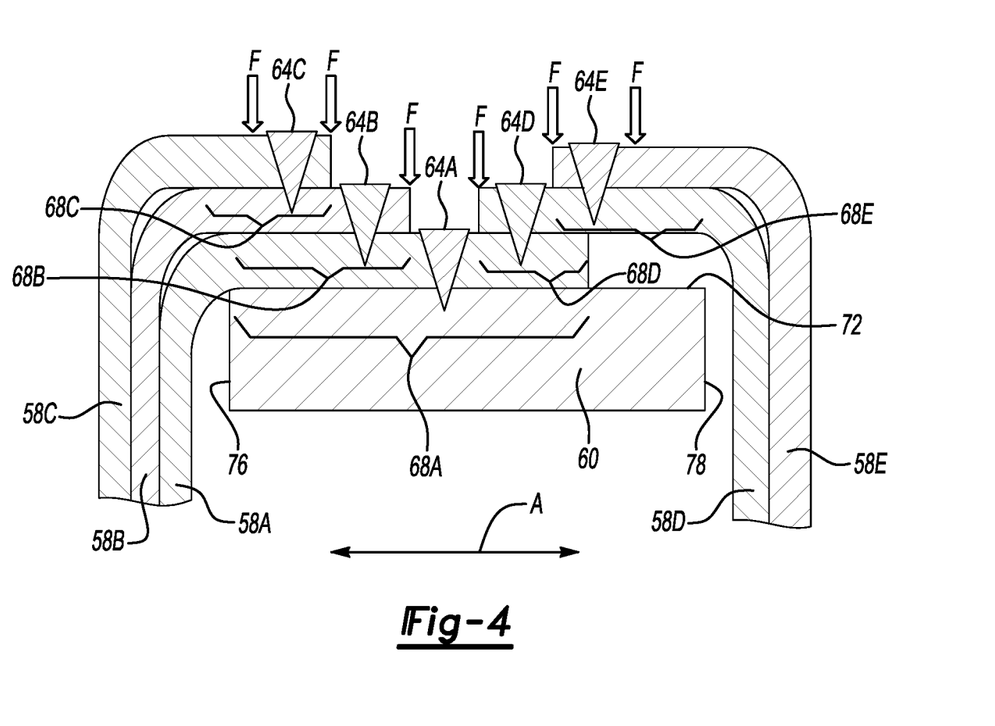
FIG. 4 illustrates a close-up view of the terminals of the battery cells in FIG. 3 secured to the busbar according to an exemplary aspect of the present disclosure.

With reference now to FIG. 4, the terminal 58A from the battery cell 56A is electrically coupled to the busbar 60A with a first weld 64A. When the first weld 64A is applied, a portion 68A of the terminal 58A is folded over a surface 72 of the busbar 60. The first weld 64A directly connects the portion 68A of the terminal 58A to the surface 72 and the busbar 60. Within the battery assembly 25 of FIG. 2, the surface 72 of the busbar 60 faces outwardly away from the battery cells 56A.

The terminal 58B from a second one of the battery cells 56B includes a portion 68B that is folded over the portion 68A of the terminal 58A such that the portion 68A is sandwiched between the portion 68B and the busbar 60. A second weld 64B directly connects the portion 68B of the terminal 58B to the portion 68A of the terminal 58A. The terminal 58B is electrically coupled to the busbar 60 through the terminal 58A.

Notably, the second weld 64B, in the exemplary non-limiting embodiment, does not extend through the portion 68A of terminal 58A to the busbar 60. Also, the second weld 64B is spaced a distance from the first weld 64A such that the first weld 64A is separate and distinct from the second weld 64B.

A third weld 64C directly connects a portion 68C of the terminal 58C from a third one of the battery cells 56C to the portion 68B of the second terminal 58B. The third weld 64C does not extend through the portion 68B of the terminal 58B to the portion 68A of the terminal 58A.

The terminals 58A, 58B, 58C extend along a first axially facing side 76 of the busbar 60 from the respective electrodes to the respective portions 68A, 68B, 68C.

The terminal 58D from a fourth one of the battery cells 56D, and the terminal 58E from a fifth one of the battery cells 56E extend along a second axially facing side 78 of the busbar 60. The terminals 58D, 58E extend along the second side 78 from respective electrodes to respective portions 68D, 68E. The terminals 58D, 58E thus extend to the surface 72 on an opposite side of the busbar 60 from the terminals 58A, 58B, 58C.

A fourth weld 64D directly connects a portion 68D of the terminal 58D to the portion 68A of the terminal 58A. The fourth weld 64D does not extend through the portion 68A of the terminal 58A to the busbar 60.

A fifth weld 64D directly connects a portion 64E of the terminal 58E to the portion 68D of the terminal 58D. The fifth weld 64E does not extend through the portion 68D of the terminal 58D to the portion 68A of the terminal 58A.

In the exemplary embodiment, the first weld 64A is applied to secure the portion 68A to the busbar 60. The second weld 64B is applied after the first weld 64A. The welds 64C, 64D, and 64E are then applied on succession.

The welds 64A-64E could be applied in another order. For example, the weld 64E could be applied prior to the welds 64D, 64A, 64B, and 64C. In still other examples, some of the welds 64A-64E could be applied at the same time. For example, the weld 64A could be applied, and then the welds 64B and 64D could be applied at the same time.

The welds 64A-64E are separate and distinct from each other. In the exemplary non-limiting embodiment, the welds 64A-64E are each spaced a distance from the other welds 64A-64E, which means that there is an unwelded area between each of the welds 64A-64E, and the directly adjacent weld 64A-64E.

In particular, the first weld 64A is spaced a first distance from the side 76 of the busbar 60. The second weld 64B is spaced a second distance from the side 76. The second distance is less than the first distance. The third weld 64C is spaced a third distance from the side 76. The third distance is less than the second distance. The fourth weld 64D is spaced a fourth distance from the side 76. The fourth distance is greater than the first distance. The fifth weld 64E is spaced a fifth distance from the side 76. The fifth distance is greater than the fourth distance.

The welds 64A-64E are laser welds in this example. Other types of welds could be used in other examples. As known, welding can generate thermal energy.

In the exemplary embodiment, thermal energy generated during welding is dissipated due to the welds 64A-64E being separate and distinct from each other. If, for example, the welds 64A-64E were instead a singular, monolithic laser weld applied to join all the terminals 58A-58E to the busbar 60, the thermal energy due to welding would be higher than the terminal energy associated with welding the separate and distinct welds 64A-64E. The thermal energy associated with the welds 64A-64E is lower because the welds 64A-64E are each smaller than the singular, monolithic laser weld that would be required to join all the terminals 58A-58E to the busbar 60. Further, applying at least some of the welds 64A-64E after others of the welds 64A-64E gives thermal energy from welding some time to dissipate.

The portions 68A-68E of the terminals 58A-58E are nested and overlapped such that appropriate areas of the portions 68A-68E are exposed for welding. The portions 68A-68E of the terminals 58A-58E have a stair-stepped type configuration in this example, such that the portions 68A-68E that are closer to the surface 72 of the busbar 60 extend axially further across the surface 72 than the portions 68A-68E spaced further from the busbar 60A.

Prior to applying the welds 64A-64E, the terminals 58A-58E can be folded and stacked as shown in FIG. 4. Clamping forces F can then applied as shown in FIG. 4 to hold the portions 68A-64E as a welding assembly applies the welds 64A-64E.

In the example of FIGS. 3 and 4, the terminals 58A, 58B, 58C extend along the axially facing side 76 of the busbar 60 to the surface 72. Also, the terminals 58D, 58E extend along the axially facing side 78 of the busbar 60 to the surface 72.

Figure 5:
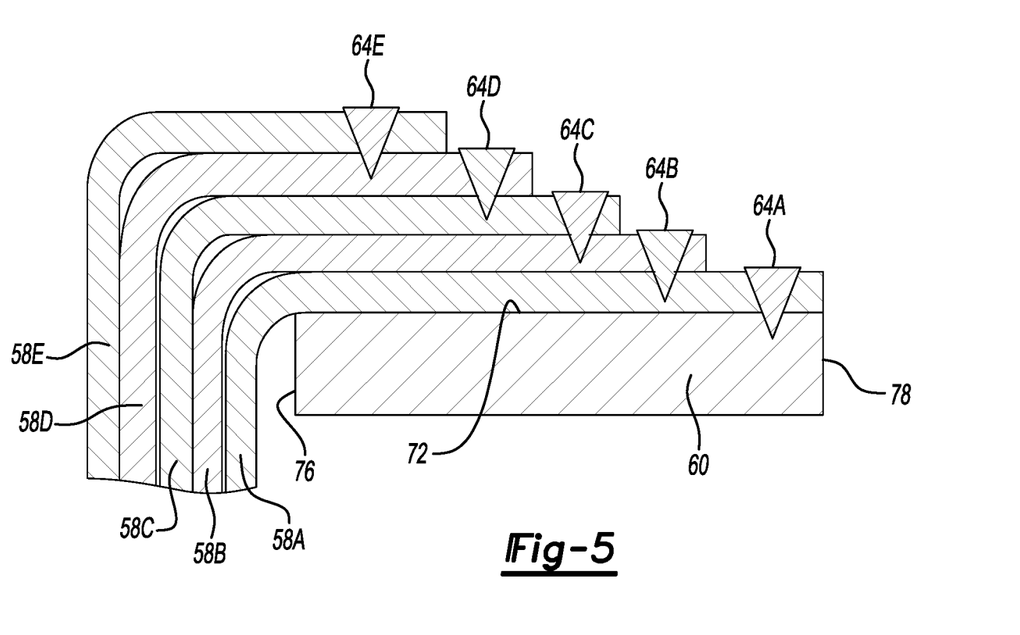
FIG. 5 illustrates a close-up view of the terminals of the battery cells in FIG. 3 secured to a busbar according to another exemplary aspect of the present disclosure.

With reference to FIG. 5, in another example, the terminals 58A-58E could all extend along the axially facing side 76 of the busbar 60 to the surface 72. In such the example, the terminal 58A can extends across the surface 72 of the busbar 60 from the side 76 to the side 78. The terminal 58B extends from the side 76, but not as far as the terminal 58A, to leave an area of the terminal 58A exposed for applying the first weld 64A. The remaining terminals 58C, 58D, 58E then extend from the side 76 is successively shorter amounts to leave areas of the underlying terminal exposed for applying the welds 64B, 64C, and 64D.

The welds 64A-64E in FIG. 5 are each separate and distinct from one another, and are each spaced a distance from the directly adjacent welds 64A-64E. The welds 64B-64E, in this example, do not penetrate through the respective, underlying terminal 58A-58D.

Figure 6A:
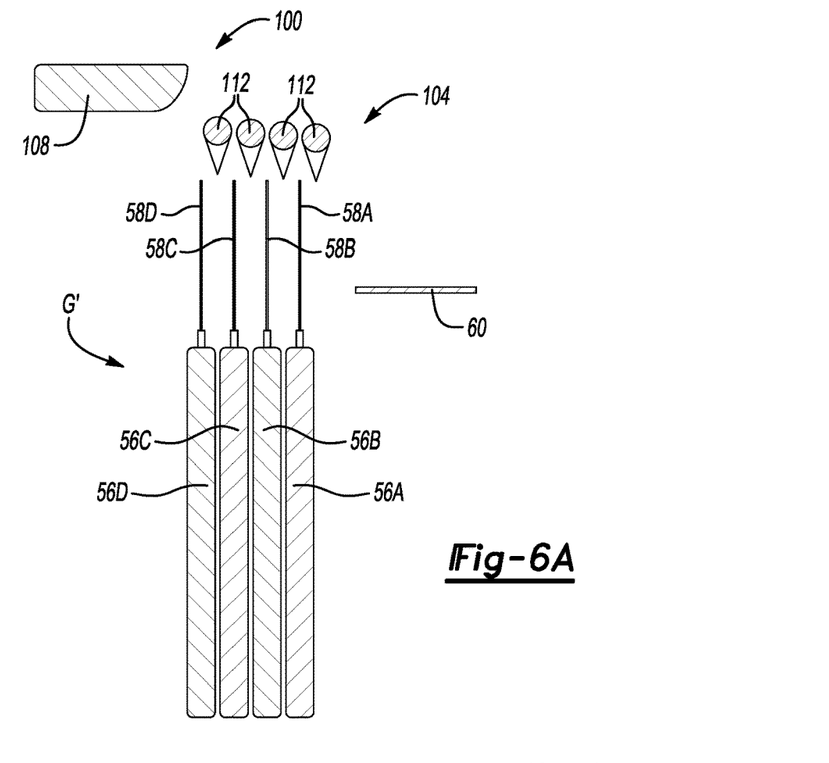
FIGS. 6A-6D illustrates a fixture assembly used to position and secure terminals of the battery cells relative to a busbar according to an exemplary aspect of the present disclosure.
Figure 6B:
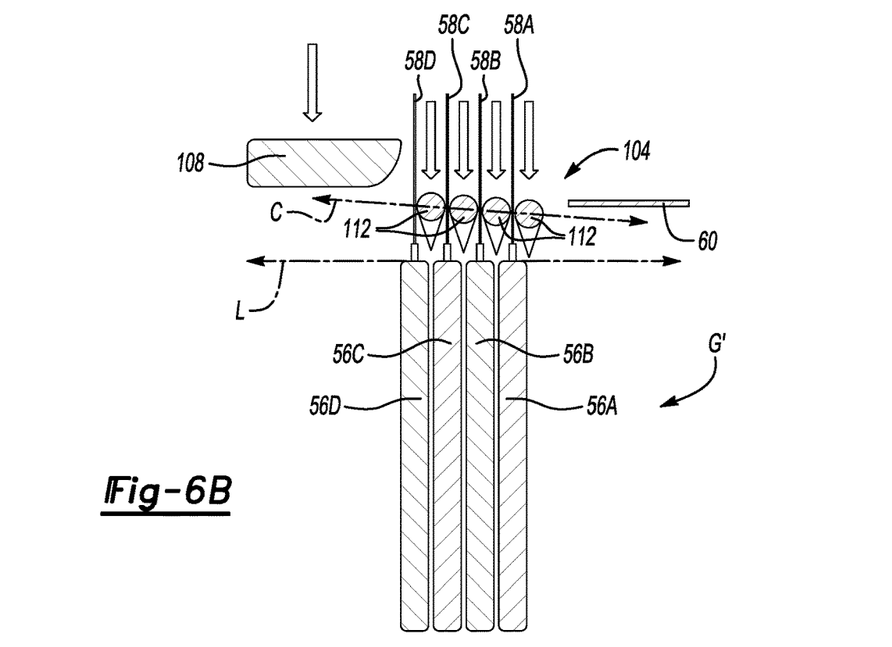
Figures 6C, 6D, 7A:
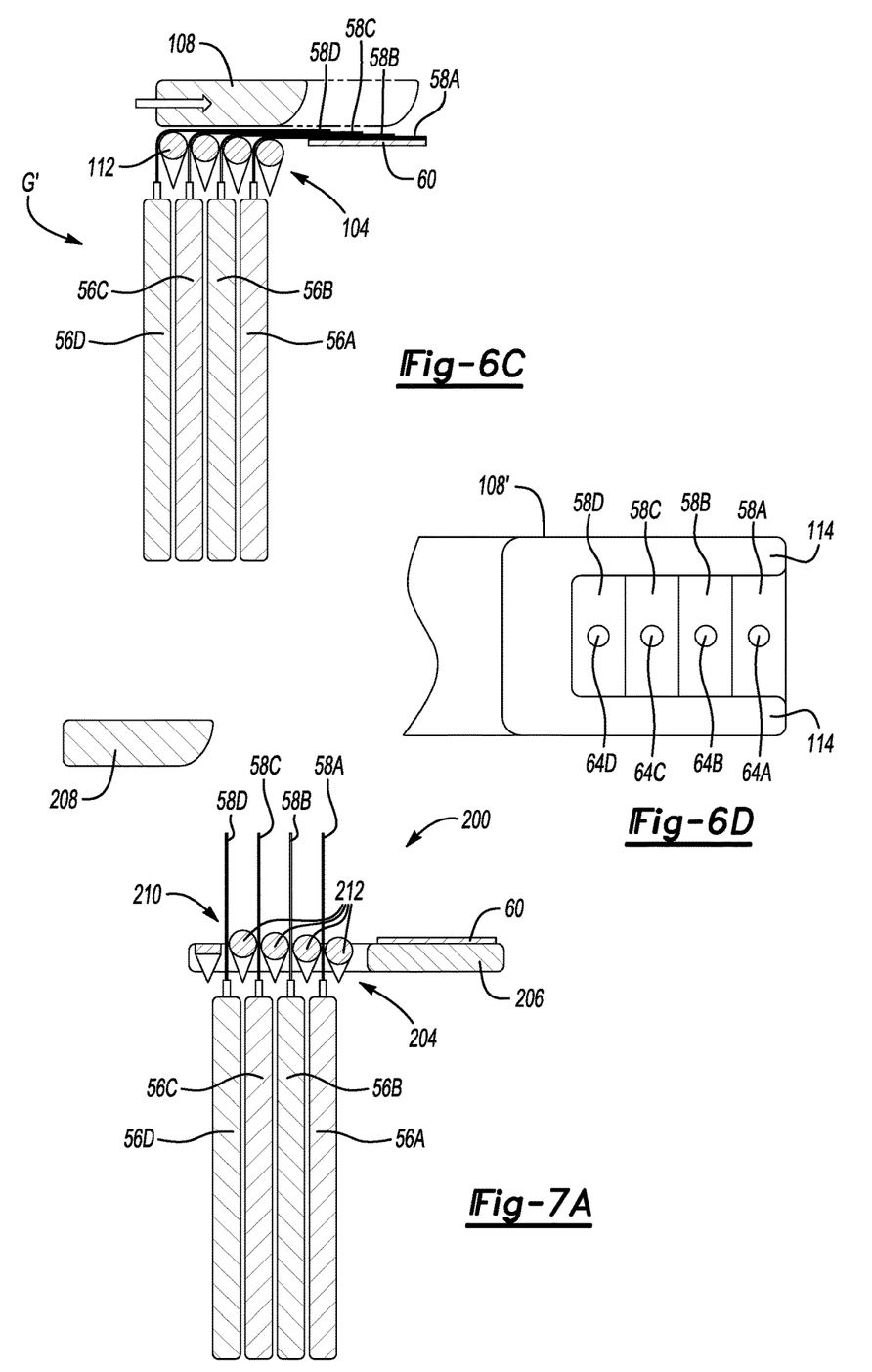
FIGS. 7A-7C illustrates a fixture assembly used to position and secure terminals of the battery cells relative to a busbar according to another exemplary aspect of the present disclosure.

With reference to FIGS. 6A-6C, an example fixture assembly 100 can be used to position terminals 58A-58D of battery cells 56A-56D when welding the terminals 58A-58D to electrically couple the terminals 58A-58D to the busbar 60. The fixture assembly 100 is used to electrically couple the terminals 58A-58D of four battery cells 56A-56D to the busbar 60. The fixture assembly 100 could be redesigned to position other more terminals or fewer terminals in other examples. The four battery cells 56A-56D provide another example group G' of battery cells.

In the exemplary non-limiting embodiment, the fixture assembly 100 includes a comb 104 and a wiper 108. The comb 104 includes a plurality of teeth 112.

During the positioning, the comb 104 is moved from the position of FIG. 6A to the position of FIG. 6B such that each of the teeth 112 of the comb 104 slip between two of the terminals 58A-58D. An actuator can be used to move the comb 104 relative to the terminals 58A-58D from the position of FIG. 6A to the position of FIG. 6B. The actuator could move the battery cells 56A-56D, the comb 104, or both. The actuator is omitted in the FIGS. 6A-6C for clarity.

The teeth 112 of the comb 104 are positioned such that, moving away from the busbar 60, each of the teeth 112 is positioned slightly further from the battery cells 56A-56D. That is, the teeth 112 are disposed along a comb axis C that is angled relative to a plane L of a laterally outer side of the battery cells 56A-56D.

After positioning the teeth 112 between the terminals 58A-58D in the position of FIG. 6B, the wiper 108 is translated across the portions of the terminals 58A-58D extending past the teeth 112. An actuator can be used to translate the wiper 108 and the terminals 58A-58D relative to each other. The actuator could move the battery cells 56A-56D, the wiper 108, or both. The actuator is omitted in the FIGS. 6A-6C for clarity.

The wiper 108 bends the terminals 58A-58D over the respective teeth 112 as shown in FIG. 6C. The teeth 112 of the comb 104 thus provide respective fulcrums about which the terminals 58A-58D are bent. Other types of fulcrums could be used in other examples. That is, the embodiments of this disclosure are not limited to the teeth of a comb structure providing fulcrums.

The terminals 58A-58D are pliable cell tab terminals, which facilitate the bending of the terminals 58A-58D in response to relative movement of the wiper 108 across the terminals 58A-58D.

Continuing to translate the wiper 108 to the broken lined area of FIG. 6C can move the terminals 58A against the busbar 60 and the terminals 58B-58D against the underlying terminal 58A-58D.

The wiper 108 can then be translated from the broken lined area of FIG. 6C back to the position of the wiper 108 in FIG. 6C. This exposes the terminals 58A-58D so that the terminals 58A-58D accessed by a welder, which applies separate and distinct welds to secure the terminals 58A-58D relative to the busbar 60.

In some examples, rather than translating the wiper 108 back from the broken lined area, the wiper 108 could include areas void of wiper material. These areas can be apertures providing weld access slots. The opening could be a "C" shaped opening that is not a fully bounded by wiper material. The welder can access appropriate areas of the terminals 58A-58D through the weld access slots. In such an example, the wiper 108 can remain in the broken lined position of FIG. 6C during the welding. The wiper 108 remaining in this position may held to compress together the terminals 58A-58D and the busbar 60 during the welding.

As shown in FIG. 6D, the weld access slot could be, for example, between fingers 114 of the wiper 108' that extend along edges of the terminals 58A-58D when the wiper 108' is in the broken lined position of FIG. 6A. The weld access slot provides clearance for a welder to apply the welds 64A-64D even with the wiper 108' remaining in the broken line position of FIG. 6C.

With reference again to FIGS. 6A-6C, the teeth 112 each have a rounded profile corresponding to a desired bend radius for the terminals 58A-58D when positioned relative to the busbar 60 for welding. The bend radius, the tapering of the teeth 112, or both, can be adjusted to expose a desired amount of the terminals 58A-58D when positioned against the busbar 60 for welding. For example, moving the tooth 112 between the terminals 58C and 58D further away from the battery cells 56A-56D will result in the terminal 58D, when bent over the tooth 112, revealing more of the terminal 58C for welding.

The wiper 108 can, in some examples, incorporate heat sink materials or heat sink features, such as fins, to facilitate moving thermal energy away from the battery cells 56A-56D during the welding.

After welding, the teeth 112 of comb 104 are withdrawn from between the terminals 58A-58D. In another example, the teeth 112 are withdrawn prior to the welding.

Figure 7B:
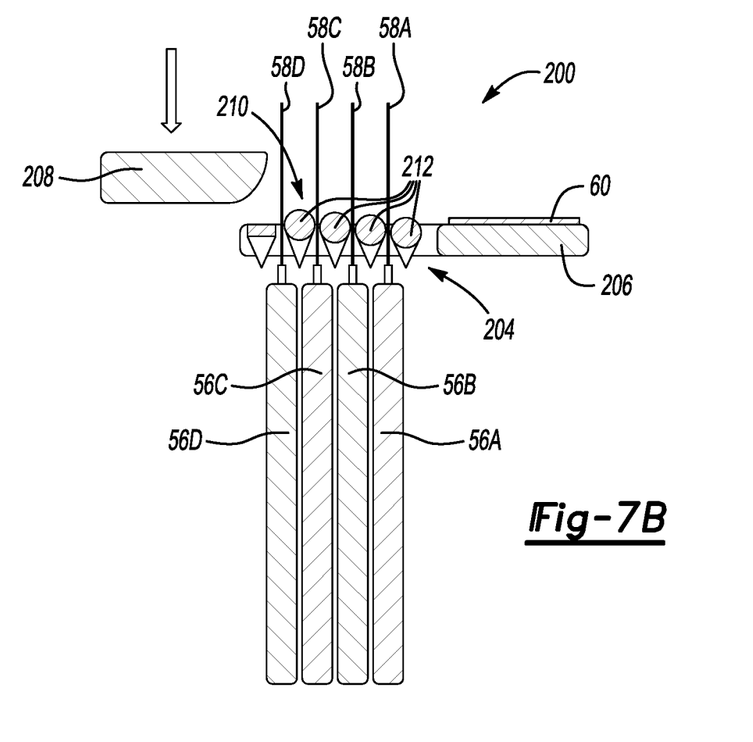
Figure 7C:
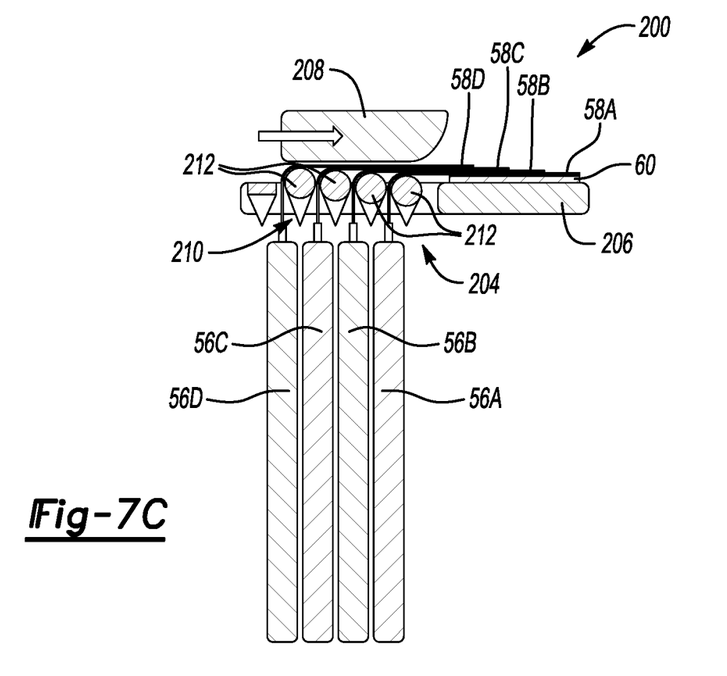

With reference now to FIGS. 7A-7C, an example fixture assembly 200 can instead be used to position terminals 58A-58D of battery cells 56A-56D when welding the terminals 58A-58D to electrically couple the terminals 58A-58D to the busbar 60. The fixture assembly 200 is used to electrically couple the terminals 58A-58D of four battery cells 56A-56D to the busbar 60. The fixture assembly 200 could be redesigned to position other more terminals or fewer terminals in other examples.

The fixture assembly 200 includes, like the fixture assembly 100 of FIGS. 6A-6C, a comb 204 and a wiper 208. However, unlike the comb 104, the comb 204 is integrated into the busbar 60, or integrated into a part of a busbar module 206 that retains the busbar 60. The teeth 212 of the comb 204 provides fulcrums about which the terminals 58A-58D are repositioned. Fulcrums other than the teeth 212 could be used in other examples.

During assembly, teeth 212 of the comb 204, are positioned between the terminals 58A-58D as shown in FIG. 7A. The terminals 58A-58D can extend through an opening 210 in the busbar module 206.

To position the terminals 58A-58D for welding, the wiper 208 is moved relatively toward the battery cells 56A-56D from the position of FIG. 7A to the position of FIG. 7B. The wiper 208 is then translated relative to the portions of the terminals 58A-58D extending past the comb 204 from the position of FIG. 7B to the position of FIG. 7C. The translating of the wiper 208 from the position of FIG. 7B to the position of FIG. 7C bends the terminals 58A-58D over the teeth 212 of the comb 204 into a position appropriate for welding the terminals 58A-58D to the busbar 60.

Notably, the comb 204 is not withdrawn from between the battery cell terminals 58A-58D after welding in this example, which is in contrast to the comb 104 in the FIG. 6A-6C embodiment. The comb 204 remains within the battery assembly as the comb 204 is integrated into the busbar 60 or bus bar module 206.

The wiper 208, like the wiper 108, could include a weld access slot that provides clearance for a welding to apply the welds even when the wiper 208 is translated to a position over the busbar 60.

Figures 8A, 8B, 8C:
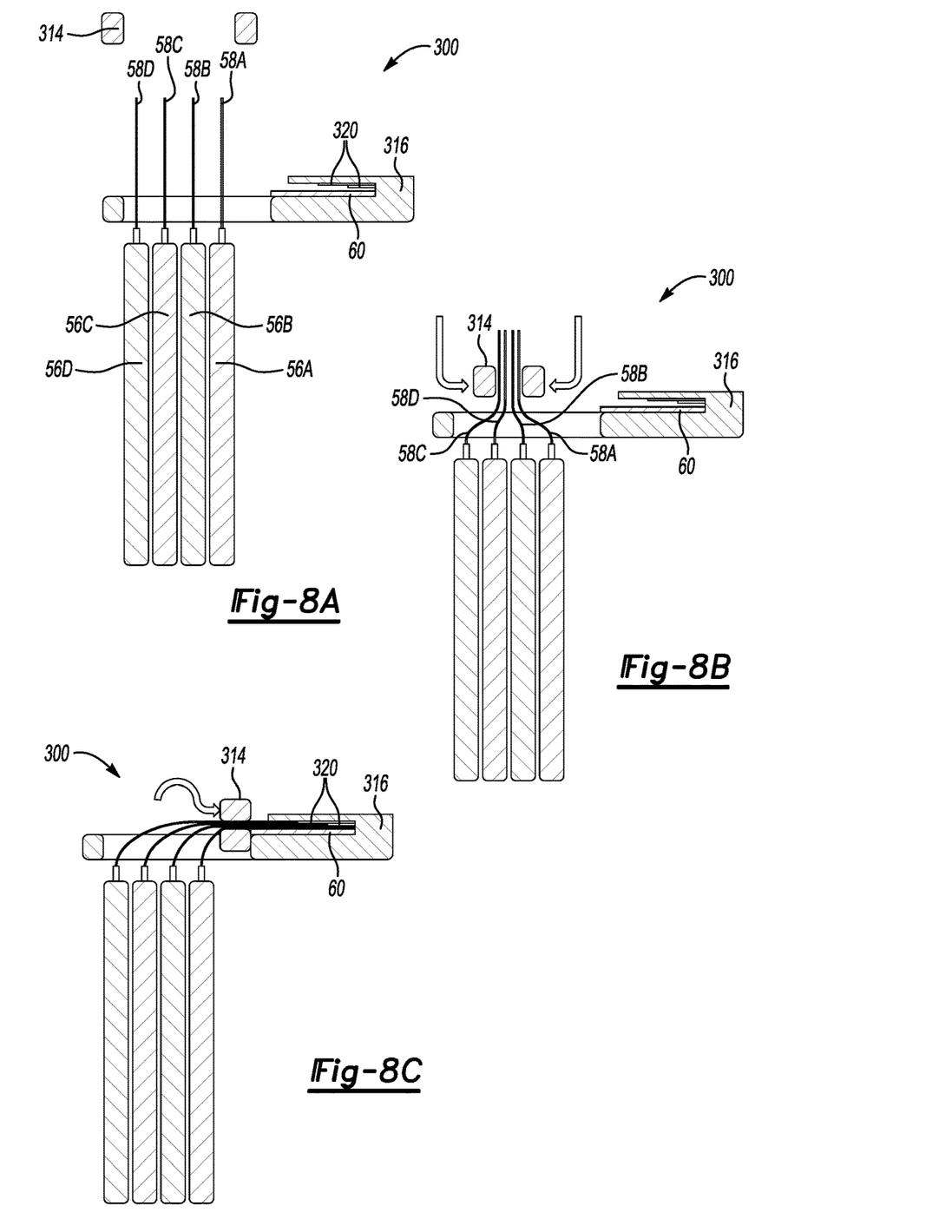
FIGS. 8A-8C illustrates a fixture assembly used to position and secure terminals of the battery cells relative to a busbar according to yet another exemplary aspect of the present disclosure.

With reference now to FIGS. 8A-8C, an example fixture assembly 300 can instead be used to position terminals 58A-58D of battery cells 56A-56D when welding the terminals 58A-58D to electrically couple the terminals 58A-58D to the busbar 60. The fixture assembly 300 is used to electrically couple the terminals 58A-58D of four battery cells 56A-56D to the busbar 60. The fixture assembly 300 could be redesigned to position other more terminals or fewer terminals in other examples.

The fixture assembly 300 incorporates pinchers 314 and an alignment block 316. The alignment block 316 is incorporated as a portion of an interconnected circuit board (ICB), a busbar module (BBM), or some other component proximate to the busbar 60. The alignment block 316 includes steps or fingers 320 at positions corresponding to a desired position for the ends of the terminals 58A-58D when secured to the busbar 60.

To use the fixture assembly 300, the pinchers 314 are moved from the position of FIG. 8A to the position of FIG. 8B to bring together the terminals 58A-58D and apply a clamping force to the terminals 58A-58D. The pinchers 314 are then rotated relative to the terminals 58A-58D, while grasping the terminals 58A-58D. The relative rotation moves the pinchers 314 and the terminals 58A-58D from the position of FIG. 8B to the position of FIG. 8C. The pinchers 314 are then moved relative to the alignment block 316 to position the terminals 58A-58D against the fingers 320 of the alignment block 316.

An actuator can be used to move the pinchers 314 and the terminals 58A-58D relative to each other, and to move the pinchers 314 from the position of FIG. 8B to the position of FIG. 8C. The actuator is omitted in the FIGS. 8A-8C for clarity.

In the position of FIG. 8C, the pinchers 314 can hold the terminals 58A-58D against the alignment block 316 as welds are applied to the terminals 58A-58D to secure the terminals 58A-58D relative to the busbar 60.

The pinchers 314 can hold the terminals 58A-58D with a force sufficient to position the terminals 58A-58D against the fingers 320 of the alignment block 316, but still permit some sliding movement of the terminals 58A-58D relative to each other.

In other examples, separate pinchers 314 could be incorporated to move individually one or more of the terminals 58A-58D against the alignment block 316 in a position appropriate for welding.

The alignment block 316 can include one or more weld clearance slots or openings to permit the welding of the terminals 58A-58D as the terminals 58A-58D are held against the fingers 320 of the alignment block 316.

Other example methods for positioning terminals for welding can include trimming the terminals to a desired length and preforming the terminals into a geometry corresponding to a desired position with respect to one another and relative to a busbar during welding. For example, the terminals can be bent and nested relative to one another such that when the battery assemblies are positioned within the battery pack, desired portions of the terminals rest against the busbar or the underlying terminal in a position appropriate for welding.

In another example, the terminals can be bent or folded into a geometry that includes some strain relief and that positions the terminals with respect to one another, prior to welding, such that the terminals are biased against one another. The biasing can facilitate a robust welding of the terminals. Strain relief geometry can be a geometry that forms the cell tab into an apparently "slack" profile, such that if a tensile load were applied to the tab between the cell and the bus bar, that the slack may decrease, but not so much that the cell tab becomes taunt and mechanically stresses the cell tab connections either at the cell side or at the bus bar side.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An attachment method, comprising:
   to electrically couple a first battery cell to a busbar, joining a terminal of the first battery cell to the busbar with a first weld; and
   to electrically couple a second battery cell to the busbar, joining a terminal of the second battery cell to the terminal of the first battery cell with a second weld.

2. The attachment method of claim 1, wherein the first weld is separate and distinct from the second weld.

3. The attachment method of claim 1, wherein the second weld does not penetrate to the busbar.

4. The attachment method of claim 1, wherein the first and second welds are laser welds.

5. The attachment method of claim 1, further comprising, prior to joining the terminal of the second battery cell to the terminal of the first battery cell, folding a portion of the terminal of the second battery cell over the terminal of the first battery cell.

6. The attachment method of claim 5, further comprising moving a wiper member against the terminal of the second battery cell to fold the terminal of the second battery cell over a fulcrum and over the terminal of the first battery cell.

7. The attachment method of claim 5, further comprising, after the folding and prior to the joining, moving the terminals of the first and second battery cells against an alignment fixture to position the terminals for the joining.

8. The attachment method of claim 1, further comprising, to electrically couple a third battery cell to the busbar, joining a terminal of the third battery cell to the terminal of the second battery cell with a third weld.

9. The attachment method of claim 1, further comprising sandwiching the terminal of the first battery cell between the busbar and the terminal of the second battery cell when the first and second battery cells are electrically coupled to the busbar via the first and second welds.

10. The attachment method of claim 1, further comprising placing a first surface of the terminal of the first battery cell against a surface of the busbar when joining with the first weld, and placing a first surface of the terminal of the second battery cell against a second surface of the terminal of the first battery cell when joining with the second weld.

11. The attachment method of claim 10, wherein, after joining with the first and second welds, the terminal of the first battery cell extends a first distance from a side of the busbar across the surface of the busbar, and the terminal of the second battery cell extends a second distance from a side of the busbar across the surface of the busbar, the first distance greater than the second distance.

12. An attachment assembly, comprising:
   a busbar;
   a first terminal of a first battery cell, the first terminal electrically coupled to the busbar with a first weld that joins the first terminal to the busbar; and
   a second terminal of a second battery cell, the second terminal electrically coupled to the busbar with a second weld that joins the second terminal to the first terminal.

13. The attachment assembly of claim 12, wherein the first weld is spaced from the second weld such that the first and second welds are separate and distinct from each other.

14. The attachment assembly of claim 12, wherein the second weld does not penetrate to the busbar.

15. The attachment assembly of claim 12, wherein the first and second welds are laser welds.

16. The attachment assembly of claim 12, wherein a portion of the first terminal is folded over a surface of the busbar when the first weld joins the first terminal to the busbar, and a portion of the second terminal is folded over the second terminal when the second weld joins the second terminal to the first terminal.

17. The attachment assembly of claim 16, wherein the portion of the first terminal is additionally folded over a first fulcrum when the first weld joins the first terminal to the busbar, and the portion of the second terminal is additionally folded over a second fulcrum when the second weld joins the second terminal to the first terminal.

18. The attachment assembly of claim 16, wherein the first weld is a spaced a first distance from a side of the busbar, and the second weld is spaced a second distance from a side of the busbar, the first distance greater than the second distance.

19. The attachment assembly of claim 12, further comprising a third terminal of a third battery cell, the third terminal electrically coupled to the busbar with a third weld that joins the third terminal to the second terminal.

20. The attachment assembly of claim 19, further comprising a third terminal of a third battery cell, the third terminal electrically coupled to the busbar with a third weld that joins the third terminal to the first terminal.

* * * * *